United States Patent
Apak

(10) Patent No.: US 12,319,272 B2
(45) Date of Patent: Jun. 3, 2025

(54) TURNING ASSISTANT FOR A VEHICLE

(71) Applicant: Bayerische Motoren Werke Aktiengesellschaft, Munich (DE)

(72) Inventor: Goekhan Apak, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 17/792,505

(22) PCT Filed: Dec. 14, 2020

(86) PCT No.: PCT/EP2020/085981
§ 371 (c)(1),
(2) Date: Jul. 13, 2022

(87) PCT Pub. No.: WO2021/144094
PCT Pub. Date: Jul. 22, 2021

(65) Prior Publication Data
US 2023/0057397 A1  Feb. 23, 2023

(30) Foreign Application Priority Data

Jan. 14, 2020  (DE) .................... 10 2020 100 728.0

(51) Int. Cl.
*B60W 30/045* (2012.01)
*B60W 10/20* (2006.01)
(Continued)

(52) U.S. Cl.
CPC .......... *B60W 30/045* (2013.01); *B60W 10/20* (2013.01); *B60W 30/09* (2013.01);
(Continued)

(58) Field of Classification Search
CPC .... B60W 30/16; B60W 30/045; B60W 30/09; B60W 30/0953; B60W 30/0956; B60W 10/20; B60W 10/10; B60W 50/082
See application file for complete search history.

(56) References Cited

U.S. PATENT DOCUMENTS 10,369,990 B2 * 8/2019 Gussner .............. B60W 30/095
11,618,473 B2 * 4/2023 Goto .................. B60W 60/0011
701/26
(Continued)

FOREIGN PATENT DOCUMENTS

CN  103477377 A  12/2013
CN  104176116 A  12/2014
(Continued)

OTHER PUBLICATIONS

International Search Report (PCT/ISA/210) issued in PCT Application No. PCT/EP2020/085981 dated Apr. 9, 2021 with English translation (six (6) pages).
(Continued)

*Primary Examiner* — George C Jin
(74) *Attorney, Agent, or Firm* — Crowell & Moring LLP

(57) ABSTRACT

A method controls a first vehicle in respect of an oncoming second vehicle. The method determines a turning situation of the first vehicle, in which an expected first trajectory of the first vehicle crosses an expected second trajectory of the second vehicle, and controls the first vehicle in such a way that, during the turning situation, a predetermined distance between the vehicles is maintained. The control includes an influencing of the direction of travel of the first vehicle.

13 Claims, 3 Drawing Sheets

(51) Int. Cl.
*B60W 30/09* (2012.01)
*B60W 30/095* (2012.01)
*B60W 30/16* (2020.01)
*B60W 50/08* (2020.01)
*B60W 10/18* (2012.01)

(52) U.S. Cl.
CPC .... *B60W 30/0953* (2013.01); *B60W 30/0956* (2013.01); *B60W 30/16* (2013.01); *B60W 50/082* (2013.01); *B60W 10/18* (2013.01); *B60W 2554/404* (2020.02)

(56) References Cited

U.S. PATENT DOCUMENTS

| | | | | |
|---|---|---|---|---|
| 2015/0166062 | A1* | 6/2015 | Johnson | G08G 1/167 |
| | | | | 701/41 |
| 2018/0029592 | A1 | 2/2018 | Trombley et al. | |
| 2018/0370528 | A1 | 12/2018 | Rittger et al. | |
| 2019/0064829 | A1* | 2/2019 | Ozawa | B60W 30/00 |
| 2019/0283751 | A1 | 9/2019 | Ueda et al. | |
| 2021/0001850 | A1* | 1/2021 | Shamshiri | B60W 30/16 |
| 2021/0269031 | A1* | 9/2021 | Nojiri | B60W 30/143 |
| 2022/0089185 | A1* | 3/2022 | Hiramatsu | B60W 30/0956 |
| 2022/0144308 | A1* | 5/2022 | Takhmar | B60W 30/0956 |

FOREIGN PATENT DOCUMENTS

| | | |
|---|---|---|
| CN | 106608263 A | 5/2017 |
| CN | 106608264 A | 5/2017 |
| DE | 102010010856 A1 | 9/2011 |
| DE | 102016201190 A1 | 7/2017 |
| DE | 10 2017 204 570 A1 | 9/2018 |
| DE | 10 2017 204 572 A1 | 9/2018 |
| DE | 10 2017 005 967 A1 | 12/2018 |
| EP | 3 118 835 A1 | 1/2017 |
| EP | 3 130 516 A1 | 2/2017 |

OTHER PUBLICATIONS

German-language Written Opinion (PCT/ISA/237) issued in PCT Application No. PCT/EP2020/085981 dated Apr. 9, 2021 (six (6) pages).

German-language Search Report issued in German Application No. 10 2020 100 728.0 dated May 26, 2020 with partial English translation (12 pages).

Chinese-language Office Action issued in Chinese Application No. 202080092695.4 dated Feb. 28, 2025 with English translation (17 pages).

Chinese-language Office Action issued in Chinese Application No. 202080092695.4 dated Feb. 8, 2025 with English translation (15 pages).

* cited by examiner

TURNING ASSISTANT FOR A VEHICLE

BACKGROUND AND SUMMARY

The invention relates to the control of a vehicle. In particular, the invention relates to the control of a vehicle during turning in the event of oncoming traffic.

A vehicle which is located on a road having oncoming traffic can cross a lane provided for oncoming vehicles when turning. In right-hand traffic, in particular turning left, and in left-hand traffic, turning right can comprise crossing the oncoming lane. The vehicle is to cross oncoming traffic in such a way that oncoming traffic is not endangered or obstructed.

If the oncoming traffic comprises a sequence of multiple vehicles, it can thus be necessary to cross between these vehicles. The determination of a point in time for the crossing can be difficult, and an incorrect determination, for example, due to an incorrectly estimated travel speed of the oncoming traffic, can significantly increase a risk of collision.

One underlying object of the invention is to provide an improved technology for improving the safety of a vehicle, which crosses oncoming traffic in a turning situation. The invention achieves the object by means of the subjects of the independent claims. Dependent claims reflect preferred embodiments.

According to a first aspect of the present invention, a method for controlling a first vehicle with respect to an oncoming second vehicle is described. According to the method, a turning situation of the first vehicle is determined, in which an expected first trajectory of the first vehicle crosses an expected second trajectory of the second vehicle. The first vehicle is then controlled in such a way that a predetermined distance is maintained between the vehicles during the turning situation. The control comprises influencing the travel direction of the first vehicle in this case.

The turning situation can exist when the first vehicle is located on a road having at least two lanes, the assigned travel directions of which are opposite to one another, or if vehicles having opposing travel directions share a lane. In right-hand traffic, the turning situation can comprise turning of the first vehicle to the left (turning left), in left-hand traffic, it can comprise turning to the right (turning right). Solely by way of example, reference is primarily made herein to right-hand traffic; a corresponding procedure can take place accordingly in the case of left-hand traffic.

The second vehicle typically follows the course of the road and does not turn itself. However, the technology presented herein can also be applied if the second vehicle turns. For the presented technology, the road can also comprise more than two lanes. A permitted travel or turning direction can be predefined individually for each of the existing lanes, in particular the turning vehicle can be located on a turn lane. In addition, more than two second vehicles can also be present, wherein the second vehicles can be underway in succession on the same lane or on lanes adjacent to one another. In this case, the vehicle has to cross behind one of the second vehicles and in front of another of the second vehicles.

By adapting the travel direction of the first vehicle during the turning, the planned first trajectory during the turning can be made flatter or steeper than initially planned, so that the lane assigned to the second vehicle can be entered and left somewhat earlier or somewhat later at predetermined travel speed of the first vehicle. A distance of the first vehicle to the second vehicle can thus be controlled by influencing the travel direction of the first vehicle.

The distance between the vehicles can be determined with respect to the travel direction and/or travel speed of one of the vehicles. A larger region can thus be kept free in front of the second vehicle than behind or laterally to the second vehicle. This can apply accordingly to the first vehicle. The distance to be maintained to a vehicle can be selected in dependence on its travel speed, so that, for example, an enlarged distance is kept free in front of a vehicle if the vehicle drives faster. A distance to be maintained behind or laterally to the vehicle can be influenced less or not at all by the traveled velocity.

It is particularly preferred that a steering intervention is controlled on the first vehicle. The steering intervention can act in particular on a steering device for influencing a travel direction. The first vehicle typically comprises two axles each having at least one wheel, and wheels of the front axle can be steered in that they are rotated around a vertical axis. In other embodiments, one wheel of another axle can also be steerable.

The technology presented herein can be applied to a two-wheeled vehicle or a vehicle having more than two wheels. The vehicle preferably comprises two axles each having two wheels, which run in two tracks. Furthermore, the vehicle preferably comprises a motor vehicle, in particular a passenger vehicle, a truck, or a bus.

The steering intervention can comprise a predetermined steering force, wherein the steering force can be counteracted by a driver of the first vehicle. The predetermined steering force is preferably sufficiently large to control a travel direction of the first vehicle and, on the other hand, sufficiently small to be compensated or overridden by a driver of the first vehicle. In one embodiment, the steering force is effectuated by means of a control motor of the steering system, for example, by a hydraulic or electrical drive, which can be part of a steering aid or power steering system. In one embodiment, the presented technology can also manage without a driver of the first vehicle; in this case, the steering force used does not have to be restricted to an amount that can be overridden by a person.

In a further preferred embodiment, a travel speed of the first vehicle is additionally reduced before the crossing. The reduction of the travel speed can be used in particular to delay a point in time at which the first vehicle plunges into the lane of the second vehicle. The first vehicle can first pass the trajectory of the second vehicle, for example, when the second vehicle has already driven past. In combination with a steeper turning trajectory, by reducing the travel speed, the predetermined distance of the first vehicle to the second can be maintained in an improved manner. Optionally, the deceleration takes place to a standstill. The deceleration of the travel speed is preferably ended before the vehicle penetrates into a driving region of the other vehicle. In another variant, the travel speed of the first vehicle can also be increased. In combination with a flatter turning trajectory, the first vehicle can thus turn better in front of the second one, without infringing the predetermined distance to it.

The travel direction of the first vehicle can be dynamically controlled as a function of a travel speed of the first vehicle. A travel speed of the second vehicle can be taken into consideration dynamically in a corresponding manner. By way of the dynamic adaptation, the method can be used in an improved manner to assist a human driver, who controls the velocity of the first vehicle. For example, if a flatter turning trajectory is controlled to cross the lane of the second vehicle in a timely manner before its approach, the influencing of the trajectory can thus be reduced if it is established that the driver accelerates the first vehicle more strongly than assumed. In a corresponding manner, the influencing can be strengthened if it is established that the first vehicle is driven more slowly than assumed. A corresponding adaptation of the influencing of the travel direction of the first vehicle can take place when crossing behind the second vehicle. In one embodiment, a travel direction change of the second vehicle is also taken into consideration, for example, if the second vehicle changes the lane.

In general, it is to be noted that in the case of multiple second vehicles, between which the first vehicle travels through when turning, the crossing behind a preceding second vehicle and the crossing in front of a following second vehicle can be controlled simultaneously.

The travel direction of the first vehicle can be controlled more strongly in the direction of the turning to enlarge a distance to the approaching second vehicle, or to maintain in an improved manner a predetermined distance to the front end of the second vehicle. This variant is typically applied in the case of crossing of the first vehicle in front of the second vehicle. When turning left (in right-hand traffic), initially stronger steering to the left can take place, when turning right (in left-hand traffic) initially stronger steering to the right can take place. This influencing of the travel direction of the first vehicle is also described herein as controlling a flatter trajectory.

Vice versa, the travel direction of the first vehicle can also be controlled less in the direction of the turning to enlarge a distance to the second vehicle moving away. This variant is typically applied during crossing of the first vehicle behind the second vehicle. This influencing of the travel direction of the first vehicle is also described herein as controlling a steeper trajectory.

The influencing of the travel direction can also take into consideration a further road user, who can be located in the region of the turning situation. The further road user can comprise, for example, a pedestrian, a bicyclist, or a third vehicle who crosses the trajectory of the first vehicle. For example, the first vehicle can be controlled in such a way that a predetermined distance is maintained to a further road user. It can also be determined whether in the region of the turning situation—typically in the region of an intersection of two roads—sufficient space is available for traveling the changed first trajectory. Existing free space is as much as possible not to be traversed by a planned trajectory of the further road user. In one embodiment, the first vehicle can be stopped if necessary after crossing the second trajectory in order to let the other road user pass in front of it.

After the complete crossing of the second trajectory, the first vehicle can be returned to the original first trajectory. The first vehicle is preferably controlled in such a way that its trajectory only deviates in the region of the turning situation from the initially planned trajectory. In particular, it is preferred that the first vehicle after the turning occupies in a timely manner a lane of the road assigned to it, into which it has turned.

In still a further embodiment, an acceleration intention of a driver of the first vehicle is recognized and the influencing of the travel direction of the first vehicle is switched off. In particular, it can be recognized that the driver desires a maximum acceleration. In this way, a driver of the first vehicle can quickly, directly, and completely take over the control of the travel direction of the first vehicle. Influencing described herein of the travel speed can also be switched off in this case.

According to a second aspect of the present invention, a device for controlling a first vehicle with respect to an oncoming second vehicle comprises a first unit for determining an expected first trajectory of the first vehicle; a second unit for determining an expected second trajectory of the second vehicle; a processing unit; and an interface for connection to a unit for influencing a travel direction of the first vehicle. The processing unit is configured to determine a turning situation in which the determined first trajectory crosses the determined second trajectory; and to control the travel direction of the first vehicle by means of influencing the travel direction in such a way that during the turning situation, a predetermined distance is maintained between the vehicles.

The processing unit can be configured to entirely or partially execute a method described herein. For this purpose, the processing unit can comprise a programmable microcomputer or microcontroller and the method can be provided in the form of a computer program product having program code means. The computer program product can also be stored on a computer-readable data carrier. Features or advantages of the method can be transferred to the device or vice versa.

The device can furthermore comprise an interface for connection to a unit for influencing a travel speed of the first vehicle, wherein the processing unit is configured to decrease and/or increase a travel speed of the first vehicle before the crossing. This unit can in particular comprise a braking system. The travel speed can be influenced together with the travel direction of the first vehicle in such a way that a predetermined distance is maintained between the first and the second vehicle. Different influences of the travel direction can take place here, depending on whether the first vehicle crosses the second trajectory before or after the second vehicle has passed the first vehicle.

According to a third aspect of the present invention, a vehicle comprises a device described herein. The vehicle preferably comprises a motor vehicle, in particular a passenger vehicle.

The invention will now be described in more detail with reference to the appended drawings.

DETAILED DESCRIPTION OF THE DRAWINGS

Figure 1:
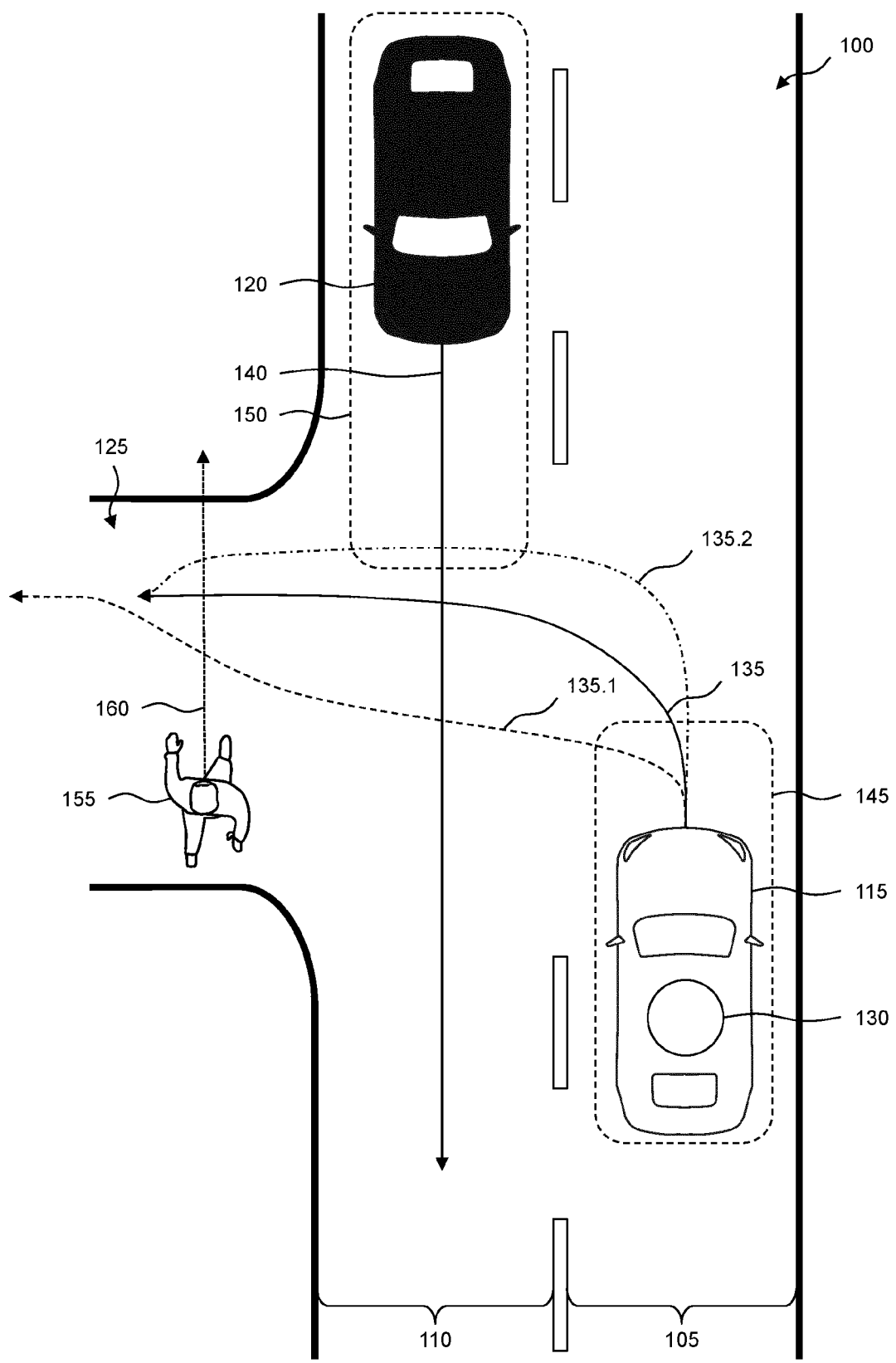
FIG. 1 illustrates an exemplary turning situation.

FIG. 1 shows an exemplary turning situation. A first lane 105 and a second lane 110 are provided on a road 100, the provided travel directions of which are opposite to one another. The illustration of FIG. 1 is based on right-hand traffic by way of example; the procedure described hereinafter takes place accordingly in the case of left-hand traffic with exchanged directions. On the first lane 105, a first vehicle 115 is located, toward which a second vehicle 120 is coming on the second lane 110. It is planned for the first vehicle 115 to turn to the left into a further road 125, and in this case to travel through the second lane 110 in the transverse direction. A control device 130 for controlling a travel direction of the first vehicle 115 is located on board the first vehicle 115. In the present illustration, the road 105 extends straight and the second vehicle 120 follows this road 105. In another embodiment, the road 105 can also extend in a curve. The second vehicle 120 can also turn, so that under certain circumstances it leaves the road 105. In the case of a curving preference road, the second vehicle 120 can travel through a curve and nonetheless remain on the original road 105. Practically, still other combinations are also conceivable. If the first vehicle 115 should have the right-of-way over the second vehicle 120, the technology described herein can thus not necessarily be required; however, it can nonetheless be applied for safety reasons.

In the illustrated situation, the first vehicle 115 follows a first expected trajectory 135, and the second vehicle 120 follows a second expected trajectory 140. The first vehicle 115 is required to yield to the second vehicle 120; its turning maneuver is to be controlled as much as possible so that a predetermined distance is maintained between the vehicles 115, 120. The distance is preferably dimensioned in such a way that there is no reason to change the second trajectory 140 of the second vehicle 120.

The turning situation comprises crossing of the expected trajectories 135 and 140. A turning process is understood hereinafter as a maneuver of the first vehicle 115 in which it moves from its lane 105 on the road 100 onto the further road 125, wherein it crosses the second lane 110. More precisely, the turning process can begin as soon as the first vehicle 115 penetrates with its outer outline into the second lane 110, and can end as soon as its outer outline has completely left the second lane 110 after the traversal. Instead of the second lane 110, a three-dimensional object can also be observed, which comprises the set of all points at which the second vehicle 120 can be located in the context of the turning process. This object is similar to a tube along the road 100 and is sometimes referred to as a "driving tube". Optionally, for these observations, the outer outline of one of the vehicles 115, 120 can be enlarged in a predetermined manner before the formation of the driving tube in order to form a safety margin.

A distance between the vehicles 115, 120 at a predetermined point in time can be determined as the smallest geometrical distance between outer outlines of the vehicles 115, 120. It is presumed here that the outlines do not penetrate; the distance is thus preferably positively defined. For the first vehicle 115, a first safety distance 145 can be defined, and/or for the second vehicle 120, a second safety distance 150 can be defined.

A safety distance 145, 150 comprises in any case an outer outline of the assigned vehicle 115, 120 and can be enlarged in relation thereto in a predetermined manner. In particular, the enlarging can be constant in the lateral direction of the vehicle 115, 120, wherein the enlarged lateral outline is preferably not wider than the respective lane 110, 115. An enlargement in the travel direction can be dependent on a travel speed of the respective vehicle 115, 120, wherein a high travel speed can cause a strong enlargement and a low travel speed can cause a low enlargement or none at all. An enlargement of the outline against the travel direction can be constant or also dependent on the travel speed, wherein it is preferred that the enlargement against the travel direction is always less than that in the travel direction. In one embodiment, the safety distance 145, 150 extends along an assigned expected trajectory 135, 140.

A predetermined distance between the vehicles 115, 120 can be maintained if the safety distances 145, 150 neither touch nor penetrate one another.

The first vehicle 115 can cross the second lane 110 in general before or behind the second vehicle 120. If the safety distances 145, 150 threaten to touch one another when the first vehicle 115 follows the expected first trajectory 135, the first vehicle can thus be controlled on a flatter first trajectory 135.1 or on a steeper trajectory 135.2. The flatter trajectory 135.1 can in particular enlarge a distance of the first vehicle 115 in front of the second vehicle 120, while the steeper trajectory 135.2 can in particular enlarge a distance of the first vehicle 115 behind the second vehicle 120.

When controlling the travel direction of the first vehicle 110 on one of the changed trajectories 135.1 or 135.2, it can be ensured that no further road user 155 is obstructed. In the present case, the further road user 155 comprises, for example, a pedestrian, who crosses the further road 125. In a similar manner as described above with respect to the vehicles 115, 120, a predetermined distance can be maintained between the first vehicle 115 and the further road user 155. An assigned safety distance (not shown) and/or an expected trajectory 160 of the further road user 155 can be taken into consideration here.

It is to be noted that the control of the trajectory 135 of the first vehicle 115 can take place additionally or alternatively to a control of the travel speed of the first vehicle 115. The first vehicle 115 can be braked to a standstill if necessary; this preferably takes place outside the above-described driving tube of the second vehicle 120. The trajectory 135 can be controlled starting from a stationary or a traveling first vehicle 115.

Figure 2:
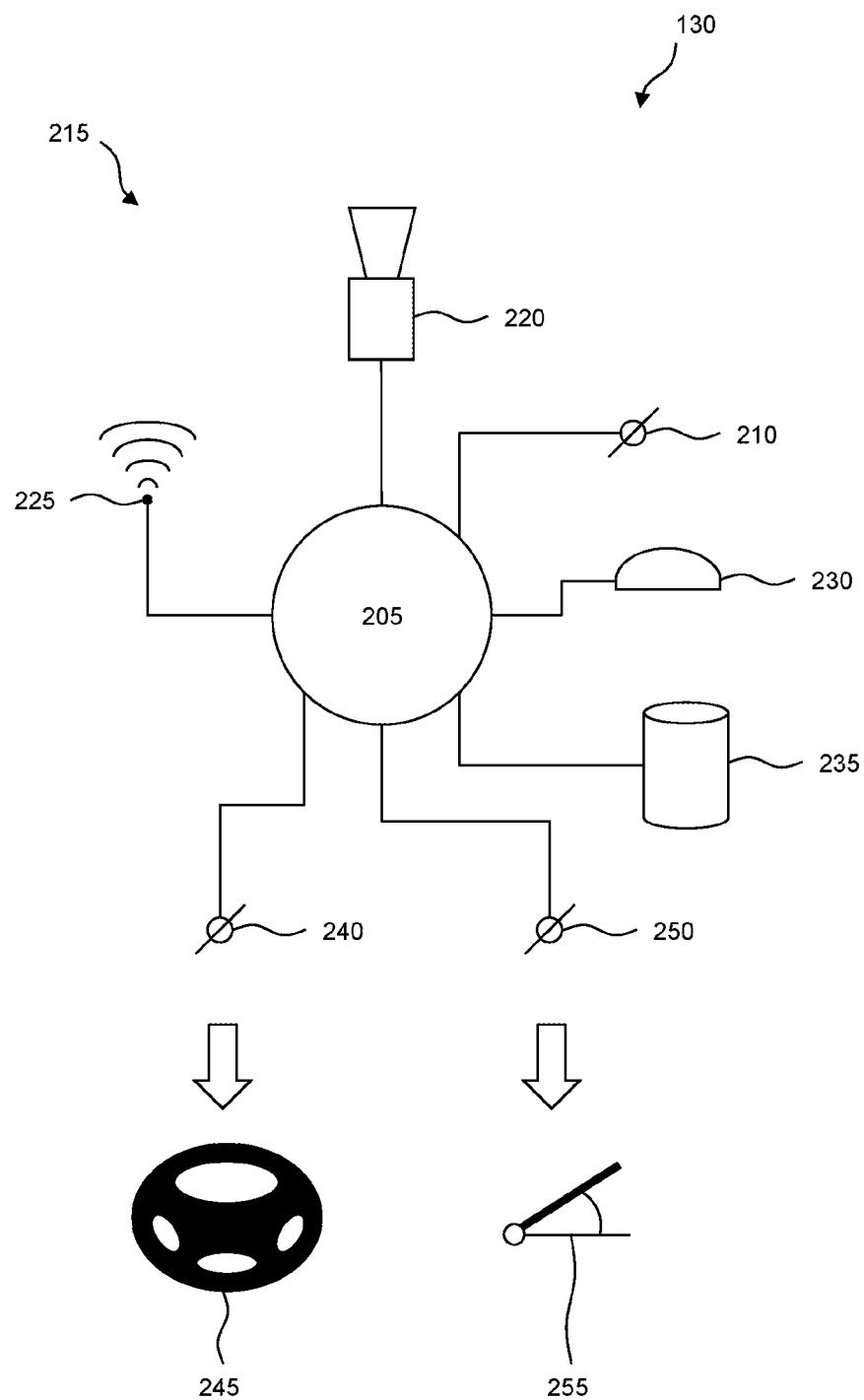
FIG. 2 illustrates an exemplary device for controlling a vehicle.

FIG. 2 shows an exemplary device 130 for controlling a first vehicle 115. The device 130 is preferably configured to be attached on board the first vehicle 115. It comprises a processing unit 205, and a first device 210 for determining the first expected trajectory 135 and a second device 215 for determining the second expected trajectory 140. The first device 210 can comprise one or more sensors which determine, for example, a movement direction, an acceleration, and/or a planned route. The movement direction can be determined, for example, by means of a compass, a navigation system, or an inertial system, the acceleration by means of an acceleration sensor, on the basis of a steering angle, or due to an actuation of an acceleration or braking system of the first vehicle 115. The planned route can be provided by a route planning system.

The second device 215 can comprise a sensor 220 for scanning the surroundings of the first vehicle 115, in particular for scanning the second vehicle 120. The sensor 220 can comprise, for example, one or more optical sensors, a radar sensor, and/or a LiDAR sensor. Items of movement information about the second vehicle 120 can also be received by means of a communication interface 225, for example, from the second vehicle 120 or from a central instance. In particular C2X technologies can be used for this purpose, for example, C2C communication (car-to-car; vehicle-to-vehicle) or C2I (car-to-infrastructure; vehicle-to-infrastructure).

The processing unit can also determine whether a turning situation exists at all on the basis of a geographic position of the first vehicle 115 and items of map information, which comprise a course of the roads 100 and 125. The geographic position of the first vehicle 115 can be determined by means of a position sensor 230, for example, a receiver of a navigation system, which is satellite-based in particular, and the items of map information can be stored in a map memory 235.

The processing unit 205 can be connected by means of a first interface 240 to a steering unit 245 and/or by means of a second interface 250 to a drive or braking unit 255 of the first vehicle 115, in order to influence a travel direction or a travel speed of the first vehicle 115.

Figure 3:
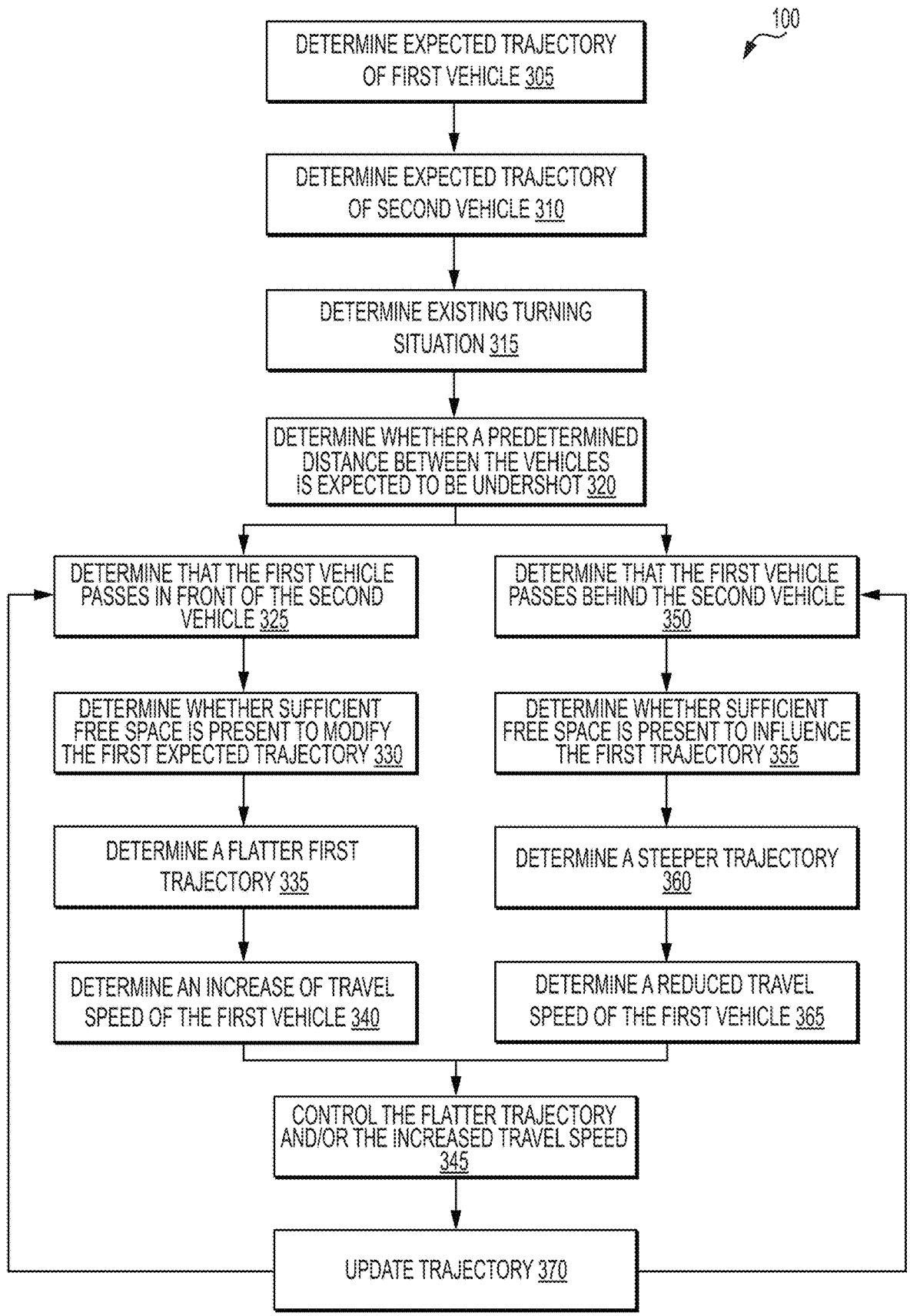
FIG. 3 illustrates a flow chart of a method for controlling a vehicle.

FIG. 3 shows a flow chart of an exemplary method 300 for controlling a first vehicle 115. In a first step 305, an expected first trajectory 135 of the first vehicle 115 can be determined and in a step 310, an expected second trajectory 140 of the second vehicle 120 can be determined. In a step 315, an existing turning situation can be determined. For this purpose, it can be determined whether the vehicles 115, 120 are located in a region which permits a turning maneuver of the first vehicle 115 with crossing of the trajectory 140 of the second vehicle 120. Such a region can in particular comprise an intersection of two roads 100, 125. A direction intention of the first vehicle 115 can be determined on the basis of further locally available items of information.

If a turning situation exists, it can thus be determined in a step 320 whether on the basis of the determined expected trajectories 135, 140, a predetermined distance between the vehicles 115, 120 is expected to be undershot. If this is the case, it can thus be distinguished whether the first vehicle 115 crosses the trajectory 140 or lane 110 of the second vehicle in front of or behind the second vehicle 120. Both cases are described hereinafter; a combination of both cases when crossing through a column of second vehicles 120 can result accordingly.

In a step 325, it can be determined that the first vehicle 115 passes in front of the second vehicle 120. In a step 330, it can be determined whether sufficient free space is present in the region of the planned turning maneuver to modify the first expected trajectory 135. If sufficient free space is present, in a step 335, a flatter first trajectory 135.1 can be determined. Optionally, in a step 340, an increase of the travel speed of the first vehicle 115 can be determined.

In a step 345, the flatter trajectory 135.1 and/or the determined increased travel speed can be controlled. If it should be determined that neither a change of the travel direction nor the travel speed nor a combination of both measures can prevent an infringement of the predetermined distance between the vehicles 115, 120, a signal can thus be output. The signal can be directed to one of the drivers of the vehicles 115, 120. On the basis of the signal, a unit for minimizing accident damage on one of the vehicles 115, 120 can be activated, for example, a belt tensioner or a pre-crash system.

In a further embodiment, the turning maneuver can also be terminated upon the signal. For this purpose, the first vehicle 115 can be transferred into a safe state, which can in particular comprise a standstill and which preferably is assumed at a point in the region of the turning process at which the first vehicle 115 as much as possible is not in the way of any other road user 120, 155.

The safe state can also comprise that the first vehicle 115 is controlled further along the road 100. At the same time, the first vehicle 115 can be decelerated, preferably to a standstill. In this way, a collision with the second vehicle 120 can be prevented in an improved manner. In this embodiment, a driver can also override an initiated steering force and/or an initiated acceleration or deceleration.

Following step 320, it can also be determined in a step 350 that the first vehicle 115 passes behind the second vehicle 120. For this purpose, the first vehicle 115 has to wait until the oncoming second vehicle 120 has traveled past it, before it turns into the second lane 110. Steps 355-365 then following can correspond in pairs to above-described steps 330-340. In a step 355, it can be determined whether sufficient free space for influencing the first trajectory 135 exists in the region of the planned turning process. In a step 360, a steeper trajectory 135.2 can be determined if sufficient free space was determined. In a step 365, a reduced travel speed of the first vehicle 115 can be determined. The reduction typically ends before the actual turning maneuver and can comprise braking of the first vehicle 115 to a standstill. In step 345, the determined trajectory 135.2 and/or the reduced travel speed can then be controlled at the first vehicle 115. The option also exists in this case of terminating the turning maneuver if it is determined that the predetermined distance between the vehicles 115, 120 cannot be maintained.

In both variants, following step 345, thus while the first vehicle 115 carries out the turning maneuver, one or both trajectories 135, 140 can be updated on the basis of observations. The observations can in particular comprise updated trajectories 135, 140 of the vehicles 115, 120. It can thus be taken into consideration when a driver of one of the vehicles 115, 120 changes the trajectory 135, 140 of their vehicle 115, 120 with respect to the travel direction and/or travel speed. The method 300 can be run through multiple times in the manner of a control loop.

REFERENCE NUMERALS 100 road
105 first lane
110 second lane
115 first vehicle
120 second vehicle
125 further road
130 control device
135 first expected trajectory
135.1 flatter first trajectory
135.2 steeper first trajectory
140 second expected trajectory
145 first safety distance
150 second safety distance
155 further road user
160 expected trajectory
205 processing unit
210 first device
215 second device
220 sensor
225 communication unit
230 position sensor
235 map memory
240 first interface
245 steering unit
250 second interface
255 drive or braking unit
300 method
305 determining first trajectory
310 determining second trajectory
315 determining turning situation
320 predetermined distance is undershot
325 passing in front of second vehicle
330 determining free space
335 trajectory flatter
340 increase travel speed
345 control vehicle
350 passing behind second vehicle
355 determining free space
360 trajectory steeper
365 reduce travel speed
370 update trajectory

What is claimed is:

1. A method for controlling a first vehicle with respect to an oncoming second vehicle, the method comprising steps of:

determining a turning situation of the first vehicle, in which an expected first trajectory of the first vehicle crosses an expected second trajectory of the second vehicle; and controlling the first vehicle in such a way that a predetermined distance between the first and second vehicles is maintained during the turning situation;

wherein the controlling comprises altering, by a processing unit, a travel direction of the first vehicle such that the first vehicle completes a turning maneuver by crossing the expected second trajectory of the second vehicle while maintaining the predetermined distance between the first and second vehicles.

2. The method according to claim 1, wherein a steering intervention on the first vehicle is controlled.

3. The method according to claim 2, wherein
the steering intervention comprises a predetermined steering force, which is counteractable by a driver of the first vehicle.

4. The method according to claim 1, wherein
a travel speed of the first vehicle is reduced before the crossing.

5. The method according to claim 1, wherein
the travel direction of the first vehicle is dynamically controlled in dependence on a travel speed of the first vehicle.

6. The method according to claim 1, wherein
the travel direction of the first vehicle is controlled in an increased manner in a direction of turning so as to increase a distance to an approaching second vehicle.

7. The method according to claim 1, wherein
the travel direction of the first vehicle is controlled in a decreased manner in a direction of turning so as to increase a distance to the second vehicle moving away.

8. The method according to claim 1, wherein
the first vehicle is controlled in such a way that a predetermined distance to a further road user is maintained.

9. The method according to claim 1, wherein
the first vehicle is returned to an original first trajectory after completely crossing the second trajectory.

10. The method according to claim 1, wherein
an acceleration intention of a driver of the first vehicle is recognized and the influencing of the travel direction of the first vehicle is switched off.

11. A device for controlling a first vehicle with respect to an oncoming second vehicle, comprising:
a first unit for determining an expected first trajectory of the first vehicle;
a second unit for determining an expected second trajectory of the second vehicle;
a processing unit, which is configured to determine a turning situation, in which the determined expected first trajectory crosses the determined expected second trajectory; and
an interface for connection to a unit for influencing a travel direction of the first vehicle;
wherein the processing unit is configured to alter the travel direction of the first vehicle such that the first vehicle completes a turning maneuver by crossing the expected second trajectory of the second vehicle while maintaining a predetermined distance between the first and second vehicles.

12. The device according to claim 11, further comprising:
an interface for connection to a unit for influencing a travel speed of the first vehicle, wherein
the processing unit is configured to reduce a travel speed of the first vehicle before the crossing.

13. A vehicle comprising a device according to claim 11.

* * * * *